(12) United States Patent
Hofmann

(10) Patent No.: US 11,885,433 B2
(45) Date of Patent: Jan. 30, 2024

(54) ACTUATOR

(71) Applicant: AUMA Riester GmbH & Co. KG, Mullheim (DE)

(72) Inventor: Benjamin Hofmann, Heitersheim (DE)

(73) Assignee: AUMA Riester GmbH & Co. KG, Mullheim (DE)

( * ) Notice: Subject to any disclaimer, the term of this patent is extended or adjusted under 35 U.S.C. 154(b) by 0 days.

(21) Appl. No.: 17/116,103

(22) Filed: Dec. 9, 2020

(65) Prior Publication Data

US 2021/0180718 A1 Jun. 17, 2021

(30) Foreign Application Priority Data

Dec. 13, 2019 (DE) .................... 102019134362.3

(51) Int. Cl.
*F16K 31/53* (2006.01)
*F16H 35/00* (2006.01)
*F16K 31/04* (2006.01)

(52) U.S. Cl.
CPC ............ *F16K 31/53* (2013.01); *F16K 31/042* (2013.01); *F16K 31/043* (2013.01)

(58) Field of Classification Search
CPC .......... F16K 31/53; F16K 31/54; F16H 35/00; F16H 2035/006
See application file for complete search history.

(56) References Cited

U.S. PATENT DOCUMENTS

| | | | |
|---|---|---|---|
| 2,438,545 A | 3/1948 | Davidson | |
| 2,443,036 A | 6/1948 | Hopkins | |
| 4,877,120 A | 10/1989 | Tysver et al. | |
| 5,139,230 A | 8/1992 | Lester | |
| 2006/0017032 A1* | 1/2006 | DeWall | F16K 31/52 251/129.11 |
| 2007/0012309 A1* | 1/2007 | Huang | F16K 31/53 126/39 N |
| 2007/0012367 A1 | 10/2007 | Hotz et al. | |
| 2014/0338475 A1* | 11/2014 | Lobo | F16K 1/123 74/30 |
| 2019/0368586 A1 | 12/2019 | Hung | |
| 2020/0248820 A1* | 8/2020 | Sakizchi | F16K 3/14 |

FOREIGN PATENT DOCUMENTS

| | | |
|---|---|---|
| DE | 3823718 | 1/1990 |
| DE | 102012022082 | 5/2014 |

* cited by examiner

*Primary Examiner* — Paul J Gray
(74) *Attorney, Agent, or Firm* — Volpe Koenig

(57) ABSTRACT

An actuator (1) having two detent devices (2) which include in each case at least one terminal detent element (3) for a part (27) of a drive train, and at least one adjustment element (4, 19) which is operatively connected to the terminal detent element (3) and is specified for setting a position of the terminal detent element (3). The at least one gear unit (5, 18) is disposed between the at least one terminal detent element (3) and the at least one adjustment element (4, 19).

13 Claims, 2 Drawing Sheets

ACTUATOR

INCORPORATION BY REFERENCE

The following documents are incorporated herein by reference as if fully set forth: German Patent Application No. 10 2019 134 362.3, filed Dec. 13, 2019.

TECHNICAL FIELD

The invention relates to an actuator having at least one detent device comprising at least one terminal detent element for a part of a drive train, and at least one adjustment element which is operatively connected to the terminal detent element and is specified for setting a position of the terminal detent element.

BACKGROUND

Actuators of the type mentioned at the outset are already known. Prior to the initial use of an actuator it is typically necessary for the at least one terminal detent element of the detent device to be set so as to establish the position of the terminal detent.

In actuators already known, the adjustment element is often configured as a screw, the screw head thereof being disposed outside a housing. The terminal detent element is in most instances connected to the adjustment element that is configured as a screw. The screw herein is guided in a thread that is configured in a housing wall such that the position of the terminal detent can be set by driving the screw out or in.

This design embodiment of the detent device however has the disadvantage that it is necessary for a lateral wall of the housing in which the screw is guided in the thread has to be accessible in order to be able to perform a setting of the terminal detent. It is therefore often difficult for a precise setting of the terminal detent to be performed specifically in the case of tight space conditions.

A further disadvantage of already known detent devices lies in that a force which acts from the inside toward the outside on the housing wall arises when the terminal detent is impinged by a part of a drive train, such as by a part that is eccentrically disposed on a shaft, for example. The compressive force that acts on account of the impingement of the terminal detent element is thus dissipated to the housing wall by way of the adjustment element. In the event of an overload that arises during operation, for example on account of a faulty operation, this can however lead to damage to the housing wall which in an extreme case can cause the housing wall to break at the joint between the housing wall and the adjustment element. However, since actuators often are elements of larger assemblies that are difficult to access, a comparatively low-maintenance operation is however desirable. Specifically, in industrial plants, it is important that operational procedures are not interrupted by the failure of an actuator.

SUMMARY

There is therefore the object to provide an actuator with performance characteristics which are improved in comparison to those of already known actuators.

This object is achieved by an actuator having one or more features as described herein.

In order for the object to be achieved, an actuator of the type mentioned at the outset which is distinguished in that at least one gear unit is disposed between the at least one terminal detent element and the at least one adjustment element is in particular proposed according to the invention. On account of the disposal of the at least one gear unit it is possible for a variation of an input torque, which is applied to the adjustment element by a user, to be converted to an output torque for setting the position of the terminal detent element. On account thereof, it is possible to more easily perform a setting of the position of the terminal detent element.

Furthermore, the dissipation of force of the compressive force acting on the terminal detent element can be improved on account thereof such that damage to a housing wall can be better avoided.

Advantageous design embodiments of the invention which can be combined individually or in combination with the features of other design embodiments, optionally conjointly with the features noted above, will be described hereunder.

According to one advantageous design embodiment, the terminal detent element can be operatively connected to a converter element of the at least one gear unit. The terminal detent element can in particular be connected to the converter element. The terminal detent element can be disposed so as to be movable, in particular pivotable about a pivot axis, relative to the converter element of the at least one gear unit. It is thus possible for the position of the terminal detent element to be set by activating the at least one adjustment element in that a transmission of force and/or torque from the adjustment element to the converter element, and from the converter element to the terminal detent element, is possible. It can moreover be achieved on account thereof that the adjustment element in terms of the longitudinal axis thereof is not, or only slightly, adjusted axially in relation to the housing part when said adjustment element is activated. The space requirement of the actuator is thus less than in the case of already known actuators, since the adjustment element protrudes from the housing part at all times in an almost consistent manner.

According to one further advantageous design embodiment, the at least one adjustment element can be connected to a housing part, in particular an inner housing part, of the actuator, wherein a contact point of the housing part having the at least one adjustment element is under a tensile load when the terminal detent element is impinged with pressure by a part of the drive train. The contact point of the housing part is in particular under a tensile load which is directed inward. An improved dissipation of force by way of the housing part is thus possible in comparison to actuators in which the contact point is loaded with pressure that is directed outward. It can thus preferably be provided that, when the terminal detent element is impinged by a part of the drive train, a load on the contact point is composed largely of a tensile force and/or largely not of a compressive force.

The contact point on the housing part can in particular be configured without a thread. The detent device is thus designed so as to be more robust than in actuators in which the detent device requires a thread on the contact point on the housing part.

According to one further advantageous design embodiment, it can be provided that the adjustment element has an adjustment head which is mounted so as to be rotatable on the housing part, in particular on a or the preferably thread-free connection point. The adjustment head can in particular have a tool engagement point and/or a gear wheel.

Alternatively or additionally thereto, it can be provided according to one further advantageous design embodiment that a spacing between the adjustment element and the housing part, in particular a spacing between the adjustment head and the housing part, remains constant when the adjustment element is activated, in particular when the adjustment element is rotated. As has already been explained above, the total space requirement of the actuator can be significantly introduced in comparison to already known actuators.

According to one further advantageous design embodiment, the at least one adjustment element can have a thread which engages in a corresponding mating thread on a converter element, for example the converter element already mentioned above, of the at least one gear unit, wherein a rotation of the adjustment element leads to a variation of the position of the converter element and/or of the terminal detent element. The variation of the position, in particular of the terminal detent element, herein can be established on an orbit, for example. A particularly positive setting of the position of the terminal detent element can thus be performed.

In order to be able to achieve a particularly positive dissipation of force when the terminal detent element is impinged, it can be provided according to one further advantageous design embodiment that a housing part, for example the housing part which has already been mentioned above and is connected to the at least one adjustment element, has an at least partially arcuate cross section, preferably a circular-arcuate cross section. A load profile on the housing part can thus be directed inward. As opposed thereto, the load profile on the housing part in already known actuators is usually directed outward. On account thereof however, damage to the housing part at the contact point is much more easily caused in already known actuators, since the dissipation of force here is significantly worse, and the resultant forces in an impingement of the terminal detent element thus predominantly act locally on the wall of the housing part.

According to one further advantageous design embodiment, a converter element, for example the converter element of the at least one gear unit that has already been mentioned above, and/or the terminal detent element can be guided so as to be adjustable in a guide device. The guide device can preferably have a non-rectilinear profile, in particular a circular-arcuate profile.

According to one further advantageous design embodiment, at least one angular gear unit can be disposed between the at least one terminal detent element and the at least one adjustment element. A first adjustment element by way of the at least one angular gear unit can in particular be operatively connected to a second adjustment element which is disposed so as to be offset at an angle in relation to the first adjustment element. Setting of the position of the terminal detent element is thus more easily possible in that a user can perform an activation of one of the adjustment elements not from the side but in particular from an upper side of the actuator. The accessibility of the adjustment element is therefore significantly improved in comparison to already known actuators in which an activation of the adjustment element is possible only on a lateral wall of the housing part, thus not from above. It is therefore difficult to be able to perform an optimal setting of the terminal detent element specifically in the case of tight space conditions. The angular gear unit can be configured as a bevel gear unit and/or a crown gear unit and/or a worm gear unit, for example.

According to one further advantageous design embodiment, it can be provided that the actuator has a first adjustment element and a second adjustment element, wherein a first gear unit is disposed between the first adjustment element and the terminal detent element, and a second gear unit is disposed between the first adjustment element and the second adjustment element. A particularly precise and comfortable setting of the position of the terminal detent element is thus possible, wherein the space requirement in the case of this design embodiment of the actuator happens to be even less than in the case of already known actuators. On account of the gear unit it is possible to achieve in each case a variation of the torque such that a rotating movement on the second adjustment element is converted to an adjusting movement of the terminal detent element. A particularly precise setting of the position of the terminal detent element is in particular possible on account thereof.

According to one further advantageous design embodiment, it can be provided that the adjustment element, in particular the first adjustment element and/or the second adjustment element, run/runs along a longitudinal axis, in particular so as to be parallel to a longitudinal axis, of a or the housing part. The space requirement for the at least one adjustment element can thus be reduced to a minimum. Alternatively or additionally thereto, the at least one adjustment element can be adjustable about the longitudinal axis.

According to one further advantageous design embodiment, the second adjustment element can have an adjustment head which is disposed on an upper side of the actuator. As has already been explained above, it is particularly advantageous herein that a setting of the position of the terminal detent element is able to be carried out more easily since the accessibility to a user is typically better on the upper side than on a side of the actuator. The adjustment head can in particular have a tool engagement point such that a setting of the position of the at least one terminal detent element can be performed by activating the adjustment head that is disposed on the upper side. A better transmission of force by a user by the matching tool is possible on account of the tool engagement point.

For example, an adjustment head can be wider than a part, such as a thread for example, that is connected to said adjustment head.

According to one further advantageous design embodiment, a detent face of the at least one terminal detent element can be aligned or be able to be aligned such that a perpendicular impingement takes place by the one part of the drive train. On account thereof, the smallest possible wear takes place, and the dissipation of force by way of the adjustment element and the housing part is optimized since the housing part has an inward tensile load when the terminal detent element is impinged by the part of a drive train. A particularly low-maintenance operation of the actuator over a long time is thus possible.

According to one further advantageous design embodiment, the first adjustment element can be routed out of the interior of the housing part on a lateral wall of the housing part. Alternatively or additionally thereto, the second adjustment element can be routed out on an end side of the actuator. The space requirement for the detent device for setting a position of the terminal detent element can thus be kept particularly minor, wherein a comfortable and precise setting is nevertheless possible at the same time.

BRIEF DESCRIPTION OF THE DRAWINGS

The invention will now be described in more detail with reference to a plurality of exemplary embodiments but is not limited to these exemplary embodiments. Further exemplary embodiments are derived by combining the features of individual or a plurality of claims and/or combining said features of individual or a plurality of claims with individual or a plurality of features of the exemplary embodiments.

In the figures.

DETAILED DESCRIPTION

Figure 1:
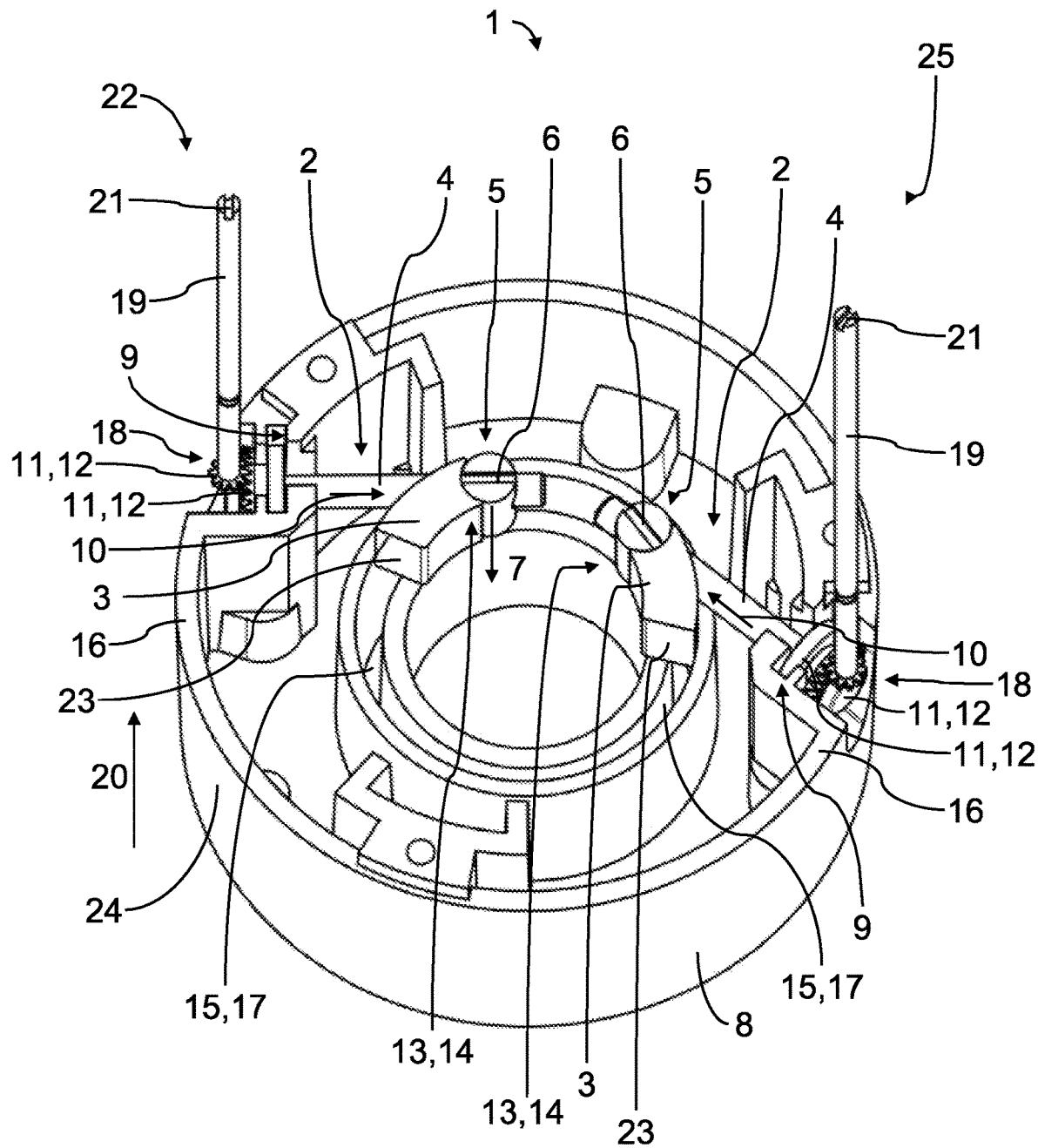
FIG. 1 shows a perspective illustration of a potential variant of embodiment of an actuator according to the invention, having two detent devices.
Figure 2:
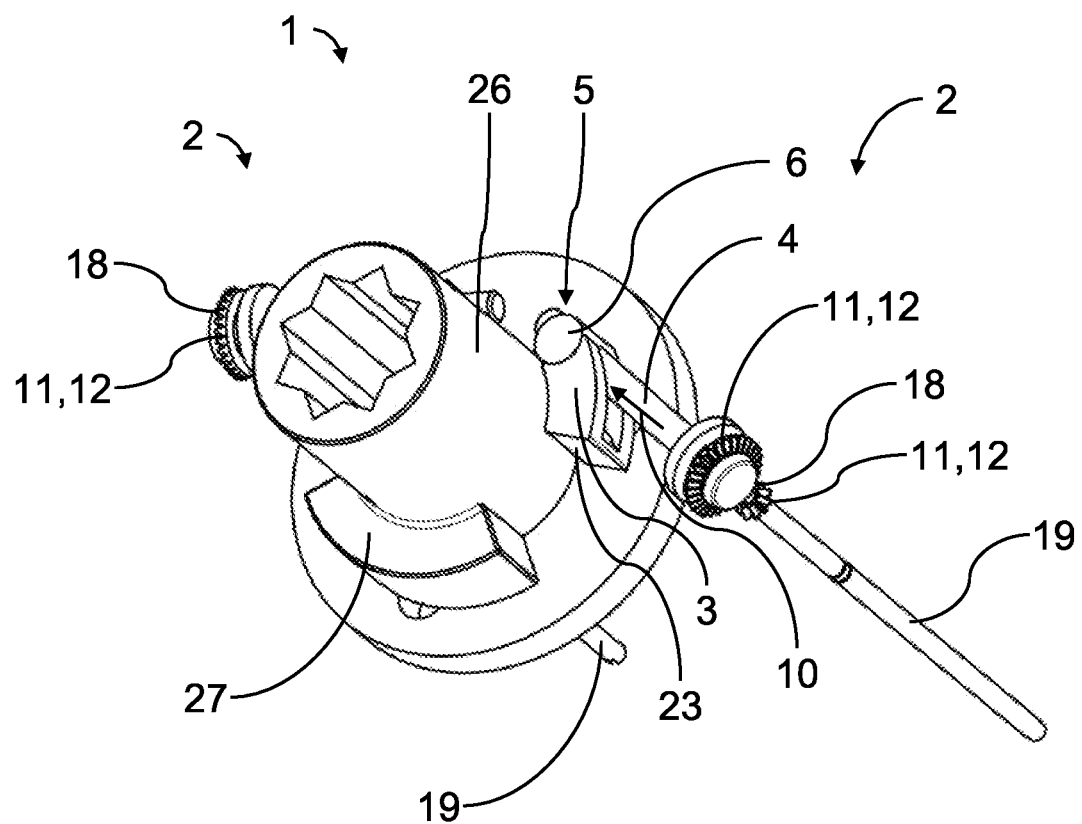
FIG. 2 shows a perspective illustration of a further potential variant of embodiment of an actuator according to the invention, having two detent devices.

FIGS. 1 and 2 show in each case an actuator which in its entirety is provided with the reference sign 1 and can be used for adjusting a valve element of a valve, for example.

The variant of embodiment of the actuator 1 shown in FIGS. 1 and 2 has two detent devices 2 which serve in each case to enable a position of a terminal detent for a part of a drive train of the actuator 1 to be set. The part can be, for example, and an eccentric element 27 which is connected to a drive shaft 26 (cf. FIG. 2).

The terminal detents herein are in each case set by a terminal detent element 3 by way of the positions of both terminal detent elements 3 being variable.

Each terminal detent element 3 is in each case operatively connected to a first adjustment element 4 such that a variation of the position of the assigned terminal detent element 3 takes place when the respective adjustment element 4 is activated and/or the adjustment element 4 is moved.

A first gear unit 5 is disposed between each terminal detent element 3 and the first adjustment element 4 assigned to said terminal detent element 3, this simplifying the setting of the position of the terminal detent element 3. Each detent device 2 thus has in each case one first gear unit 5.

Each terminal detent element 3 is in each case coupled to one converter element 6 of in each case one first gear unit 5, wherein the terminal detent elements 3 herein are configured so as to be movable, in particular pivotable about a pivot axis 7, relative to the converter element 6 assigned to said terminal detent element 3.

The first adjustment element 4 is connected to a housing part 8 of the actuator 1. The housing part 8 can be an inner housing part, for example.

A contact point 9 of the housing part 8 having the first adjustment element 4 is under a tensile load when the terminal detent element 3 is impinged with pressure by the already-mentioned part 27 of the drive train. On account thereof, an improved dissipation of force by way of the housing part 8 can arise than when compressive loading of the housing part 8 takes place at the contact point 9.

The contact point 9 on the housing part 8 is configured without a thread. When the terminal detent element 3 is impinged by a part 27 of the drive train there is thus a load on the contact point 9 largely on account of the tensile force 10, thus in particular largely not on account of a compressive force.

The first adjustment element 4 has an adjustment head 11 which is mounted so as to be rotatable in a radial bearing on the housing part 8, for example. The adjustment head 11 here is configured as a gear wheel 12. The radial bearing can preferably be configured by the contact point 9. On account thereof, a spacing between a wall, in particular a lateral wall 24, of the housing part 8 remains the same or almost the same even after an activation, in particular after rotation, of the first adjustment element 4. It is essential herein that the at least one adjustment element 4 is not driven out of or into the housing part 8 when said adjustment element 4 is activated. It can thus be prevented that the first adjustment element 4 in any position does not protrude far from the housing part 8.

Each first adjustment element 4 has a thread 13 which is screwed into a corresponding mating thread 14 on the associated converter element 6. In the rotation of the first adjustment element 4 and adjustment of the converter element 6 takes place in that the adjustment element 4 is driven into or out of the mating thread 14, on account of which a relative adjustment of the converter element 6 in relation to the adjustment element 4 takes place.

The terminal detent element 3, by virtue of the converter element 6 being coupled to a terminal detent element 3, is entrained in an adjustment of the converter element 6 and is therefore adjusted in terms of the position of said terminal detent element 3. The terminal detent element 3 is preferably adjusted on an orbit 15.

In other words, it can be said that the first gear unit 5 of a detent device 2 is configured by a converter element 6 having a mating thread 14, and a corresponding thread 13 (preferably of the first adjustment element 4) which interacts with the mating thread 14.

The first adjustment element 4 at the contact point 9 is coupled to a housing part 8 which in the cross section 16 is configured so as to be arcuate. A particularly positive dissipation of force is possible on account of the arcuate profile of the housing part 8 when the housing part 8 is under a tensile load, thus when the load profile on the housing part 8 is directed inward.

The actuator 1 has a guide device 17 in which at least the converter element 6 and/or the terminal detent element 3 are/is guided so as to be reversibly adjustable. The guide device 17 in the variant of embodiment shown in FIG. 1 has a guide rail having an at least partially non-rectilinear profile.

Each detent device 2 of the actuator 1 moreover has a second gear unit 18 which in the variants of embodiment shown in FIGS. 1 and 2 is in each case designed as an angular gear unit.

The second gear unit 18 is disposed between the at least one terminal detent element 3 and a second adjustment element 19.

The second gear unit 18 connects the first adjustment element 4 to the second adjustment element 19, wherein the first adjustment element 4 is disposed so as to be offset at an angle in relation to the second adjustment element 19. The two adjustment elements 4, 19 are moreover operatively connected by way of the second gear unit 18, in particular by way of the two gear wheels 12. An adjustment of the first adjustment element 4 and finally also a variation of the position of the terminal detent element 3 thus takes place when the second adjustment element 19 is activated.

The design embodiment of the actuator 1 described above has the advantage that the two adjustment elements 4, 19 are mutually disposed at an angle such that the location of the disposal of an activation element and/or of a tool engagement point 21 for setting the position of the terminal detent are/is freely selectable. It can thus be prevented that an access to the activation element and/or to the tool engagement point 21 is impeded because said activation element and/or said tool engagement point 21 lie/lies at a location of the actuator 1 that is difficult to access.

The second adjustment element 9 in the design embodiment shown in FIGS. 1 and 2 is aligned along a longitudinal axis 20, in particular so as to be parallel to a longitudinal axis 20, of the housing part 8. This arrangement is particularly space-saving.

The second adjustment element 19 on both ends thereof has in each case one adjustment head 11, wherein the two adjustment heads 11 can be configured as gear wheels 12 and/or as a tool engagement point 21.

The detent faces 23 of the two terminal detent elements 3 are aligned, or able to be aligned, such that a perpendicular impingement takes place by the one part 27 of the drive train. An optimal dissipation of force is provided on account thereof.

The first adjustment element 4 is routed out of the interior of the housing part 8 on a lateral wall 24 of the housing part 8. The second adjustment element 19 is routed out on an end side 25 of the actuator 1.

The invention thus relates in particular to an actuator 1 having two detent devices 2 which comprise in each case at least one terminal detent element 3 for a part 27 of a drive train, and at least one adjustment element 4, 19 which is operatively connected to the terminal detent element 3 and is specified for setting a position of the terminal detent element 3, wherein at least one gear unit 5, 18 is disposed between the at least one terminal detent element 3 and the at least one adjustment element 4, 19.

LIST OF REFERENCE SIGNS

1 Actuator
2 Detent device
3 Terminal detent element
4 First adjustment element
5 First gear unit
6 Converter element
7 Pivot axis
8 Housing part; inner housing part
9 Contact point
10 Tensile force
11 Adjustment head
12 Gear wheel
13 Thread
14 Mating thread
15 Orbit
16 Arcuate cross section
17 Guide device
18 Second gear unit (angular gear unit, for example)
19 Second adjustment element
20 Longitudinal axis of the housing part
21 Tool engagement point
22 Upper side
23 Detent face
24 Lateral wall of the housing part
25 End side of the housing part
26 Drive shaft
27 Eccentric element

The invention claimed is:

1. An actuator for actuating a valve element of a valve, comprising:
   at least one detent device for establishing a position of a terminal detent, each of the at least one detent device including
      at least one terminal detent element including a detent face as a respective one of the terminal detent and configured to impinge on a part of a drive train of the actuator, and
      at least one adjustment element which is operatively connected to the at least one terminal detent element, and which is configured to set the position of the at least one terminal detent element,
   wherein the at least one adjustment element comprises a first adjustment element and a second adjustment element,
   wherein at least one transmission is disposed between the at least one terminal detent element and the at least one adjustment element,
   wherein a first gear unit is disposed between the at least one terminal detent element and the first adjustment element,
   wherein a second gear unit is disposed between the first adjustment element and the second adjustment element, such that a rotating movement of the second adjustment element is converted to an adjusting movement of the at least one terminal detent element, and
   wherein at least one of the first gear unit and the second gear unit includes a converter element, the at least one adjustment element has a thread which engages in a corresponding mating thread on the converter element, and a rotation of the adjustment element leads to a variation of a position of at least one of the converter element or of the terminal detent element with respect to the drive train.

2. The actuator as claimed in claim 1, wherein the first gear unit comprises a converter element, and the terminal detent element is operatively connected to the converter element, or the terminal detent element is disposed so as to be movable relative to the converter element of the first gear unit, or both.

3. The actuator as claimed in claim 1, further comprising a housing part, and the at least one adjustment element is connected to the housing part, a contact point of the housing part having the at least one adjustment element is under a tensile load when the terminal detent element is impinged with pressure by a part of the drive train.

4. The actuator as claimed in claim 3, wherein the second adjustment element has an adjustment head which is rotatably mounted on the housing part, and a spacing between the second adjustment element and the housing part remains constant when the second adjustment element is activated.

5. The actuator as claimed in claim 1, further comprising a housing part that is connected to the at least one adjustment element, the housing part has an at least partially arcuate cross section, and a load profile on the housing part is directed inward.

6. The actuator as claimed in claim 1, wherein the gear unit includes a converter element, and at least one of the converter element or the terminal detent element is adjustably guideable in a guide device, and the guide device has a non-rectilinear profile.

7. The actuator as claimed in claim 1, further comprising at least one angular gear unit disposed between the at least one terminal detent element and the at least one adjustment element.

8. The actuator as claimed in claim 7, wherein the at least one angular gear unit is operatively connected by the first adjustment element to the second adjustment element which is disposed so as to be offset at an angle in relation to the first adjustment element.

9. The actuator as claimed in claim 8, wherein the angular gear unit comprises at least one of a bevel gear unit, a crown gear unit, or a worm gear unit.

10. The actuator as claimed in claim 1, wherein the second adjustment element is parallel to a longitudinal axis of a housing part and is adjustable about said longitudinal axis.

11. The actuator as claimed in claim 10, wherein the second adjustment element has an adjustment head that includes a tool engagement point disposed on an upper side of the actuator, and the adjustment head is configured to set a position of the at least one terminal detent element.

12. The actuator as claimed in claim 1, wherein the detent face of the at least one terminal detent element is aligned or alignable such that a perpendicular impingement takes place by a part of a drive train.

13. The actuator as claimed in claim 1, further comprising a housing part, and the first adjustment element is routed out of an interior of the housing part on a lateral wall of the housing part, and the second adjustment element is routed out on an end side of the actuator.

\* \* \* \* \*